Feb. 10, 1970   D. WEINER   3,494,687

FLUID LENS USING ELECTRIC OR MAGNETIC FIELD GRADIENTS

Filed Nov. 6, 1967

INVENTOR
D. WEINER
BY
*Lyman Sherman*
ATTORNEY

United States Patent Office 3,494,687
Patented Feb. 10, 1970

3,494,687
FLUID LENS USING ELECTRIC OR MAGNETIC FIELD GRADIENTS
Daniel Weiner, Keyport, N.J., assignor to Bell Telephone Laboratories, Incorporated, Murray Hill, N.J., a corporation of New York
Filed Nov. 6, 1967, Ser. No. 680,897
Int. Cl. G02b 1/06
U.S. Cl. 350—179         3 Claims

ABSTRACT OF THE DISCLOSURE

The adverse effects of gravity upon the rotational symmetry of a fluid lens are minimized by the application of counteracting inhomogeneous electric or magnetic fields. The vertical fields and gradients polarize the fluid particles and exert a net force upon them which is opposite to the gravitational force.

---

This invention relates to gaseous lenses and other fluid transmission devices and, in particular, to means for maintaining circular symmetry in such devices.

BACKGROUND OF THE INVENTION

In U.S. Patents 3,355,235; 3,390,932; 3,390,934; 3,399,942; 3,400,993; 3,410,627; 3,410,628; and 3,415,588 there are described various types of gaseous lenses and gaseous transmission media particularly adapted for the transmission of optical wave energy. It is a characteristic of the devices described in the abovementioned copending applications, that a refractive index gradient is established across the wavepath as a means for controlling the optical wave energy propagating therethrough.

Basically there are two types of gaseous waveguiding devices. In one type, a radial thermal gradient is established in the gas within the wavepath. This results in a variation in the refractive index across the wavepath which tends to focus the wave energy and to maintain a collimated beam.

The second type of gaseous device utilizes two or more gases of different refractive indices, injected simultaneously into the optical wavepath, to produce the desired radially varying index of refraction across the wavepath.

To operate properly, both types of gaseous waveguiding devices require a fair degree of circular symmetry. However, gravitational effects tend to distort this symmetry by deforming the lines of constant density. This is evident in a two-gas lens as the heavier of the two gases tends to settle to the bottom of the enclosure, thereby distorting the lens action. In the thermal gas lens, the cooler and, hence, denser gas similarly settles to the bottom of the enclosure. However, as the cooler gas comes into contact with the enclosure it is heated and is itself displaced by other, cooler gas, creating convection currents. The resulting turbulence further distorts the optical properties of such lenses.

SUMMARY OF THE INVENTION

As is known, many materials can be polarized by the application thereto of an electric or magnetic field. A measure of the degree of polarization is given by the electric or magnetic susceptibility of the material. If, in addition, the field is inhomogeneous, a net force is exerted which tends to move the material in the direction of increasing field gradient.

In accordance with the present invention, deleterious gravitational effects in a fluid transmission device are minimized by the application of a counteracting, inhomogeneous electric or magnetic field. Specifically, the product of the field intensity and the field gradient are such as to produce a net upwardly-directed force on the fluid particles that is equal to the downwardly-directed gravitational force.

In one of the illustrative embodiments to be described in greater detail hereinafter, an electric field is applied across a gaseous lens in a direction transverse to the direction of gas flow. The requisite field inhomogeneity is obtained by making the upper electrode smaller than the lower electrode, thus producing a field gradient in a direction opposite to the gravitational field.

In a second embodiment of the invention to be described, a magnetic field is employed. In general, the choice of either an electric field embodiment or a magnetic field embodiment depends upon the fluids employed in the particular system and other system considerations, such as space and cost.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
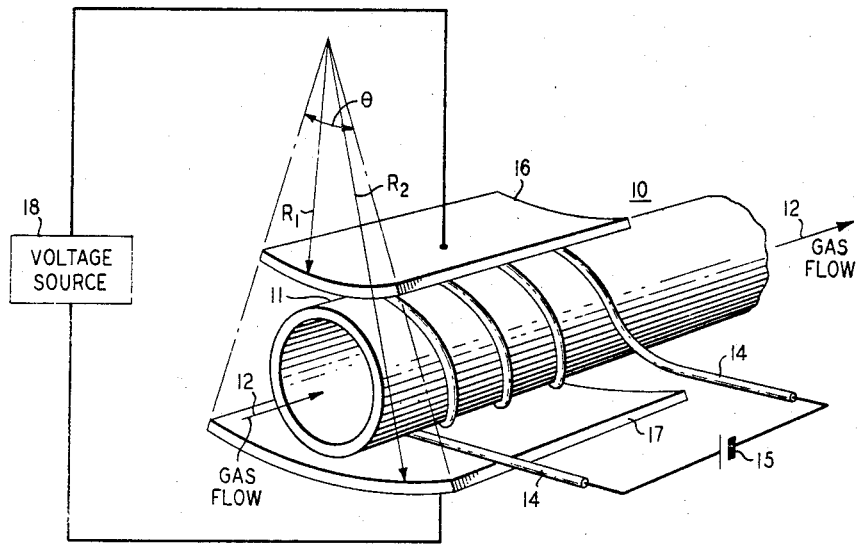
FIG. 1 shows a first embodiment of the invention employing an electric field to counteract gravitational effects in a gaseous waveguide.

Referring to FIG. 1, there is shown a portion of a horizontally extending optical waveguide 10 comprising a hollow tube 11 within which a longitudinal gas flow, indicated by the arrows 12, has been established. Means for introducing the gas and regulating its input pressure and temperature, including filters, compressors, heating and/or cooling means, all of conventional forms, though not shown, are normally included in systems of the type contemplated, as is well known to those skilled in the art.

As described previously, the gas in tube 11 can comprise either a single gas across which a radial thermal gradient is established, or a laminar flow of two or more gases of different refractive indices and densities. Various means for establishing either of these gas flows are described in the copending applications noted above and incorporated herein by reference.

For purposes of illustration, a thermal gaseous lens is illustrated in which a radial thermal gradient is established in the gas by means of a heating element 14 wrapped around tube 11. The heating element can be a pipe, circulating a hot fluid, or, as illustrated, can comprise a resistive winding connected to a direct-current source 15.

To minimize the deleterious effects produced by gravity, which would tend to cause the cooler and, hence, heavier gas at the center of the waveguide to flow down towards the bottom of tube 11, a pair of electrodes 16 and 17 are located on opposite sides of the waveguide. In the illustrative embodiment shown, the two electrodes are arcs of two concentric circles of radius $R_1$ and $R_2$, respectively, which subtend a common angle $\theta$. However, other shapes can just as readily be employed to produce particular field configurations or to conform to space and other system requirements.

As indicated hereinabove, the electric field must be inhomogeneous so as to produce a net force upon the polarized fluid particles. Accordingly, the upper electrode 16 is made smaller than the lower electrode 17. The effect is to produce an increasing field gradient in an upward direction, i.e., opposite to the downwardly-directed gravitational force.

The electrodes are energized from a voltage source 18.

It should be noted that the polarity of the electric field is of no consequence. That is, the upper electrode can be either positive or negative relative to the lower electrode. Accordingly, either an alternating-current or a direct-current source can be used.

The gravitational force $F_g$ acting on a fluid is given by $$F_g = \rho g \quad (1)$$

where
$\rho$ is the fluid density and
$g$ is the gravitational constant

The electric field force $F_e$ is given by $$F_e = X_e E \frac{dE}{dx} \quad (2)$$

where
$X_e$ is the electric susceptibility of the fluid;
$E$ is the electric field intensity;

and
$dE/dx$ is the electric field gradient

To produce equilibrium, the two opposite forces given by Equations 1 and 2 are made equal such that $$\rho g = X_e E \frac{dE}{dx}$$

and, hence, $$E \frac{dE}{dx} = \frac{\rho g}{X_e} \quad (3)$$

Equation 3 relates the product of the electric field intensity $E$ and the electric field gradient $dE/dx$ to the density and the electrical susceptibility of the fluid, and to the gravitational constant.

As an example, using water vapor at 120° C., the product $E dE/dx$ is equal approximately to $10^8$ volts/cm.² In the arrangement shown in FIG. 1, a voltage of approximately 10,000 volts, impressed across electrodes 16 and 17, where $R_1 = 1$ cm., and $R_2 = 2$ cm., would accommodate a waveguide of 1 cm. diameter and provide the required voltage gradient of about 10,000 volts/cm.²

Figure 2:
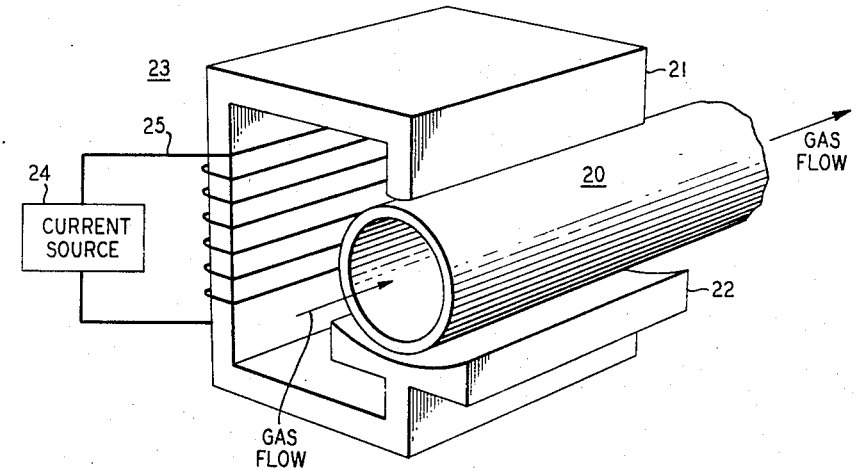
FIG. 2 shows a second embodiment of the invention employing a magnetic field.

FIG. 2 shows an alternative embodiment of the invention wherein a section of waveguide 20 is located between oppositely-disposed magnetic polepieces 21 and 22 of magnet 23. As in the embodiment of FIG. 1, the upper pole is smaller than the lower pole in order to provide the upwardly-directed magnetic field gradient. Magnet 23 can be a permanent magnet or, as shown, can be an electromagnet energized by means of a coil 25 and a current source 24.

Equilibrium is established when $$H \frac{dH}{dx} = \frac{\rho g}{X_m} \quad (4)$$

where
$\rho$ is the fluid density;
$g$ is the gravitation constant;
$X_m$ is the magnetic susceptibility of the fluid;
$H$ is the magnetic field intensity;

and
$dH/dx$ is the magnetic field gradient

As an example, gravitational effects upon the paramagnetic gas $O_2$, at room temperature, can be minimized using readily available magnetic fields of about $10^4$ Gauss, and magnetic field gradients of the order of $10^3$ Gauss per centimeter.

It will be recognized that the direction of the electric and magnetic fields in the two illustrative embodiments are not exactly parallel to the direction of the gravitational field. Thus, in calculating the necessary field intensity and field gradient, suitable account should be taken of the angle between the counteracting field and the gravitational field if the angle is large. In practice, however, the approximate field strengths can be calculated and the final, fine adjustments made visually using Mach-Zehnder interference patterns or by other suitable experimental means. In addition, it will be noted that the product of the field intensity and field gradient required to cancel the gravitational force is typically not uniform due, for example, to temperature gradients in the fluids that cause the susceptibility to be nonuniform. Accordingly, more efficient cancellation, where required, would involve a more careful tailoring of the field intensity and the field gradient.

It will also be recognized that other arrangements for producing the required electric or magnetic fields can be employed, depending upon the particular application at hand. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:
1. In an optical transmission system, a lens comprising:
a hollow, elongated enclosure;
a fluid within said enclosure characterized by a radial density gradient;
means for counteracting the effects of gravity upon the density distribution of said fluid comprising a transverse electric or magnetic field whose field intensity increases in the direction opposite to the direction of the gravitational force.
2. The lens according to claim 1 wherein:
said fluid is a gas; and
wherein said density gradient is produced by heating means located along said enclosure.
3. The lens according to claim 1 wherein:
said density gradient is produced by means of at least two different gases.

References Cited

UNITED STATES PATENTS 2,836,652   5/1958   Sprague.
3,399,012   8/1968   Peters _____ 350—179 X
3,409,345   11/1968  Marcuse et al. _____ 350—179

OTHER REFERENCES

Gloge: Deformation of Gas Lenses by Gravity, The Bell System Technical Journal, vol. XLVI, No. 2, February 1967, pp. 357–365.

JOHN K. CORBIN, Primary Examiner